(12) United States Patent
Vendrow

(10) Patent No.: US 11,876,842 B2
(45) Date of Patent: Jan. 16, 2024

(54) SYSTEM AND METHOD FOR IDENTIFYING ACTIVE COMMUNICATOR

(71) Applicant: RingCentral, Inc, Belmont, CA (US)

(72) Inventor: Vlad Vendrow, Reno, NV (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 17/468,158

(22) Filed: Sep. 7, 2021

(65) Prior Publication Data
US 2023/0073828 A1   Mar. 9, 2023

(51) Int. Cl.
| | | |
|---|---|---|
| *G06F 15/16* | (2006.01) |
| *H04L 65/403* | (2022.01) |
| *G06F 3/04812* | (2022.01) |
| *G06V 40/20* | (2022.01) |
| *H04L 65/401* | (2022.01) |
| *H04L 65/611* | (2022.01) |

(52) U.S. Cl.
CPC ........ *H04L 65/403* (2013.01); *G06F 3/04812* (2013.01); *G06V 40/28* (2022.01); *H04L 65/401* (2022.05); *H04L 65/611* (2022.05)

(58) Field of Classification Search
CPC .. H04L 65/403; H04L 65/611; G06F 3/04812; G06V 40/28
USPC ................. 709/204, 201, 202, 203
See application file for complete search history.

(56) References Cited

U.S. PATENT DOCUMENTS

| | | | |
|---|---|---|---|
| 9,942,519 B1* | 4/2018 | Pan ....................... H04N 21/47 |
| 10,992,903 B1* | 4/2021 | Yang ....................... H04N 7/15 |
| 11,228,625 B1* | 1/2022 | Libin ................... G06V 40/176 |
| 2005/0078170 A1* | 4/2005 | Firestone ............... H04M 3/567 |
| | | | 348/E7.083 |
| 2017/0085854 A1 | 3/2017 | Furesjö et al. |
| 2018/0124359 A1* | 5/2018 | Faulkner ............... H04L 65/403 |
| 2019/0215464 A1* | 7/2019 | Kumar ..................... H04N 7/08 |
| 2022/0103963 A1* | 3/2022 | Satongar ............... G06F 3/0486 |
| 2023/0068798 A1* | 3/2023 | Etchart ..................... G06T 7/74 |

FOREIGN PATENT DOCUMENTS

WO    WO-03058518 A2 *  7/2003  ............. A63F 13/12

* cited by examiner

*Primary Examiner* — Lan Dai T Truong

(57) ABSTRACT

A method includes receiving a plurality of video data associated with a plurality of users in an electronic conference. The method further includes processing the plurality of video data to determine whether an action of a user matches an active communicator action. In response to determining that the action of the user matches the active communicator action, the method further includes determining that the user intends to actively communicate audio or video data in the electronic conference. Moreover, the method includes identifying the user as an active communicator within the electronic conference.

21 Claims, 13 Drawing Sheets

SYSTEM AND METHOD FOR IDENTIFYING ACTIVE COMMUNICATOR

TECHNICAL FIELD

The present disclosure relates generally to the field of computer supported conferencing. More specifically, and without limitation, this disclosure relates to systems and methods for identifying active communicators during an electronic conference.

BACKGROUND

Recent advancements in technology and in particular online technology, have led to increased use of conferencing systems. For example, it is often the case that members of the same team or different teams work together from different geographical locations. Accordingly, use of conferencing systems plays an integral role in modern businesses. In general, one participant at a time speaks during an electronic conference session and is identified as the active communicator. If more than one participant speaks at the same time, the system often also identifies those participants as active communicators rapidly as they speak. In other words, identifying active communicators has traditionally been performed based on audio level, e.g., loudest detectable audio level associated with a participant identifies that participant as the active communicator.

Unfortunately, identifying an active communicator based on audio level results in certain inaccuracies. For example, in an electronic conference call, a participant may be joining the session from home and that user's dog may be barking in the background. The conferencing system may identify the user as the active user because it detects the loud barking noise even though the user has not taken action to become and does not wish to be identified as an active communicator. Furthermore, identifying active users based on audio level does not consider participants that communicate using sign language.

SUMMARY

Accordingly, a need has arisen to identify an active communicator of an electronic conferencing session based on cues separate from audio levels. For example, an active communicator of an electronic conferencing session may be identified based on body language, sign language, motions or gestures, etc. Once the participant is identified as an active communicator, the user may be graphically identified as such in order to distinguish the active communicator from inactive communicators.

The appended claims may serve as a summary of the invention.

These and other features and aspects of the concepts described herein may be better understood with reference to the following drawings, description, and appended claims.

DETAILED DESCRIPTION

Figure 1:
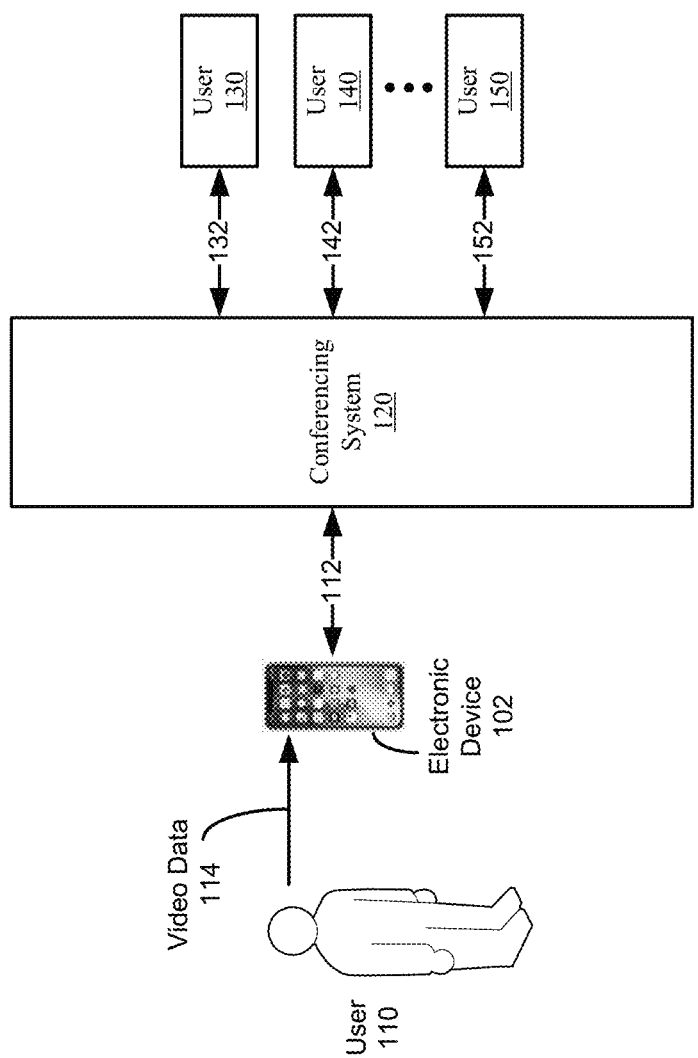
FIG. 1 is a diagram showing an example of user participating in an electronic conference and identification of a user as an active communicator during the electronic conference according to some embodiments.

The example embodiments described herein are directed to an electronic conferencing system. The electronic conferencing system is configured to facilitate communication between users. Communication may be through audio, video, webinar, 3D/virtual or augmented reality, or a combination thereof, e.g., via telephony and/or video conferencing, etc. It is appreciated that communication may facilitate other types of data exchanges, e.g., text, file, email, etc. Moreover, it is appreciated that the term "user(s)" generally refers to participants of an electronic conferencing session.

As discussed, there is a need to identify an active communicator in an electronic conferencing session. An active communicator may be a user that is actively communicating or intends to communicate with other participants. For example, an active communicator may be a user that would like to speak or is speaking. In another example, an active communicator may be a user that would like to communicate using sign language or is communicating using sign language. In some nonlimiting examples, an active communicator may be a user that would like to share content, e.g., presentation, video, audio, etc. Moreover, in some embodiments, an active communicator may be a user that would like to take control of the electronic conferencing session, e.g., by taking control of the mouse, by taking control with respect to document(s) to share, by taking control of moderating users in the electronic conferencing session, etc.

It is appreciated that an active communicator is identified without using audio level. For example, an active communicator in an electronic conferencing session is identified despite presence of audio or lack thereof. In some embodiments, a video footage associated with each user (i.e. participant) in the electronic conferencing session is first captured and subsequently processed to determine whether the video footage contains an action performed by the participant that is consistent with being an active communicator or desire to be an active communicator in the electronic conferencing session.

For example, a camera may be used to capture a video footage (e.g., video stream or still picture at regular or irregular intervals) for each user. The captured video data may be processed (by user device or by the backend server or combination thereof) by a processor to identify various user actions, e.g., body movements, prolonged eye contact, lip movements, raising a hand, sign language, typing on a keyboard, mouse movements, etc. It is appreciated that various video and image processing techniques may be used to identify user action and further to determine whether the user action matches an active communicator action. For example, a deep neural network (DNN) may be used to classify actions, speech recognition, classify lip movements, etc. A subclass of DNN is convolutional neural network (CNN) that is used for image and video processing.

The conferencing system or the electronic device used by each user to facilitate the electronic conferencing session may store a plurality of active communicator actions. The plurality of active communicator actions are actions that if determined to have been performed by a participant, identifies that participant an active communicator in the electronic conferencing session. For example, active communicator action may include raising a hand, certain body movements or gesture such as pointing at a display or nodding or staring at a predetermined graphical user interface (GUI) icon on the display screen for a certain period of time, certain lip movement patterns, certain hand gesture such as sign language saying "I" or "Speak", certain pattern for body movement (e.g., clapping and touching one's nose), etc. A comparison between the identified user actions and the plurality of active communicator actions may result in a match (or near match hereinafter referred to as match) or a mismatch. The user is identified as an active communicator if a match is found and the user is identified as an inactive communicator in response to a mismatch. It is appreciated that the plurality of active communicator actions may be stored, e.g., by the administrator, prior to the start of the electronic conferencing session (e.g., right before the conferencing session or days or months before). In some embodiments, the active communicator actions may be known to the participants of the electronic conferencing session such that those actions can be performed by a user that intends to become an active communicator and for the system to identify that user as an active communicator.

It is appreciated that once a user is identified as an active communicator, the user may be graphically designated as such in a GUI. For example, a border may be rendered around an icon associated with the active communicator. In some nonlimiting examples, an icon such as an active microphone may be displayed in association with the active communicator. In yet other examples, the icon for the active communicator may be enlarged in comparison to inactive communicators or alternatively icons for inactive communicators may be reduced in comparison to the active communicator. In yet another example, the audio and/or video associated with the active communicator may be accentuated, e.g., by raising the volume, increasing the window size of the video feed, increasing the brightness of the video feed associated with the active communicator, etc., and in some nonlimiting examples, the audio and/or video associated with inactive communicators may be suppressed, e.g., audio volume may be reduced or muted, window size of the video feed may be reduced, brightness of the video feed for inactive communicators may be dimmed, etc.

It is appreciated that in some embodiments, the active communicator actions may be provided, e.g., by system administrator. Thus, the active communicator action to become an active communicator is known and may be communicated to users of the electronic conferencing system. For example, the active communicator action may be a particular sign language saying the first-person singular "I" or it may be raising a hand or it may be eye movements in a particular fashion or staring at a particular icon for a certain period of time, to name a few examples. Accordingly, users of the electronic conferencing system may mirror the active communicator action to signal that they wish to become an active communicator.

In some embodiments, the active communicator actions may be derived using various machine learning algorithms using supervised training data, semi-supervised training data, or unsupervised training data. In one nonlimiting example, video feeds from various electronic conferencing sessions may be utilized where a user is an active communicator and also various electronic conferencing sessions where a user is not an active communicator. In other words, the input and output may be known. Knowledge of the which video feed includes an active communicator and which video feed excludes an active communicator can be used as an output and the actual video feed may be used as an input of a machine learning algorithm. The input video feeds are processed to identify actions that are randomly weighted and ultimately the output is determined. If the output results in the expected output then the model may be confirmed after a few iterations and the model may be used for live data. However, if the output is different from the expected output then the process is repeated over and over again until the expected output results from the model, thereby training the model. The trained machine learning algorithm model may then be used in real time to analyze user's action and if the action is determined to be consistent with the model (i.e. action consistent with the user being an active communicator) then the user is identified as an active communicator. It is appreciated that leveraging machine learning algorithm and analyzing user behavior of many participants of electronic conferencing sessions may identify a pattern (body gesture, body behavior, hand gesture, etc.) associated with an active communicator that can be used in identifying active communicators in electronic conferencing sessions. As such, a need to rely on audio level that tends to be unreliable is eliminated. It is appreciated that the embodiments are described with respect to identifying active communicator actions to identify active communicators for illustrative purposes but it is not intended to limit the scope of the embodiments. For example, a similar process may be used to identify inactive communicator actions to identify inactive communicators.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "rendering," "utilizing," "launching," "calling," "starting," "accessing," "sending," "conferencing," "triggering," "ending," "suspending," "terminating," "monitoring," "displaying," "removing," "suppressing," "designating," "accentuating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIG. 1 is a diagram showing an example of user participating in an electronic conference and identification of a user as an active communicator during the electronic conference, according to some embodiments. In this nonlimiting example, a user 110 may join an electronic conferencing session, e.g., voice call, video conference call, webinar, etc., using an electronic device 102 by a connection 112 to a conferencing system 120. It is appreciated that the electronic device 102 may be any electronic device, e.g., a laptop, smart phone, tablet, etc. In some embodiments, the conferencing system 120, e.g., a web-based server, facilitates the electronic conferencing session, such as telephony and/or video conferencing, between one or more electronic devices associated with user 110 and one or more electronic device associated with other users, e.g., user 130, user 140, . . . , user 150, of the conferencing system 120. Accordingly, audio data, video data, and/or other types of data may be exchanged (e.g., files shared, text messages, etc.) among the users. It is appreciated that user 130 may establish a communication link 132 to other users (e.g., user 110, user 140, . . . , user 150), user 140 may establish a communication link 142 to other users (e.g., user 110, user 130, . . . , user 150), and user 150 may establish a communication link 152 to other users (e.g., user 110, user 130, user 140, . . . ) via the conferencing system 120. It is appreciated that communication among users may be audio communication, video communication, file sharing, texting, etc.

In this example, user 110 intends to speak (i.e. wishes to become an active communicator). The camera on the electronic device 102 may be activate and it may be capturing video data 114 associated with user 110. It is appreciated that the video data 114 may or may not be shared with other users. For example, in a teleconference where no video data is being shared to other users, video data may still be captured by the conferencing system 120 and used to identify an active communicator of the electronic conferencing session. The video data 114 may be a video stream or still picture. The video data 114 may be processed by the electronic device 102, the conferencing system 120 or a combination thereof.

The processing of the video data 114 identifies various action performed by the user 110. For example, the user 110 may be eating during the electronic conferencing session and as such the action performed by the user is the act of eating. In another example, the user 110 may be speaking and as such the action may be lip movements associated with the user 110. In yet another example, the user 110 may be looking away from the camera and speaking to someone (other than users of the electronic conferencing session) while in another example the user 110 may be looking into the camera and speaking or reading from a piece of paper or may be scrolling through digital content, etc. In yet another nonlimiting example, the user 110 may be making hand gestures, e.g., raising hand, sign language, pointing to the display device, etc., or making body gestures, e.g., nodding head, shaking head, resting head on his/her hand, closing eyes, shrugging shoulders, eye movements in a certain pattern, staring at an icon, etc.

It is appreciated that the video data 114 processing may be performed by the electronic device 102, the conferencing system 120, or a combination thereof. In some embodiments, the processing may be performed by a backend server separate from the electronic device 102 and the conferencing system 120. It is appreciated that various video and image processing techniques may be used to identify user action. For example, DNN may be used to classify actions, speech recognition, classify lip movements, etc. A subclass of DNN is CNN that may be used. The processing identifies various user actions, e.g., body movement, lip movements, raising a hand, sign language, typing on a keyboard, mouse movement, eating, speaking, looking to the side, nodding, shrugging shoulders, eye movements, etc.

The identified actions of the user 110 may be compared to a plurality of active communicator actions. As presented above, the active communicator actions may have been stored in a memory component by an administrator. The users of the electronic conferencing system 120 may be notified of what those active communicator actions are, such that a user who intends to become an active communicator can perform those actions and to be designated as by the conferencing system 120 as an active communicator. In other words, the active communicator actions may be predetermined and stored in a database, and compared to ongoing identified actions of a user during a live conference session, according to some embodiments. As discussed above, active communicator actions may include a particular sign language, raising hand, a particular body language/behaviors, particular lip movements, eye movements or direction, looking at a particular icon on the display for a certain period of time, particular pattern of body movements, etc. It is appreciated that the comparison of the identified user action to the plurality of active communicator actions may be performed by a processing unit. For example, a processing unit (e.g., at the conferencing system 120) may be used to classify the user action and compare the user action to the classification of active communicator action. If an identified action of the user 110 matches one of the active communicator actions, then the user 110 is identified as the active communicator, otherwise the user is identified as inactive or passive participant. As presented above, the active communicator actions may be stored in the electronic device 102, the conferencing system 120, or a combination thereof prior to the start of the electronic conferencing session.

As presented above, in some embodiments, the active communicator actions may be derived using various machine learning algorithms during training and derivation of the machine learning model. Once the model for the machine learning algorithm is established, the identified actions by the user 110 may be fed into the model of the machine learning algorithm as an input. The output of the machine learning algorithm determines whether the action by the user 110 is consistent with actions of active communicator and if so then the user 110 is identified as an active communicator. It is appreciated that in some embodiments, the active communicator actions based on the machine learning algorithm may not be predetermined or publicized to the users of the electronic conference system 120. In other words, there may be no need for the user to take any active steps in becoming an active communicator but merely normal human behavior and movement can be interpreted by the system and the appropriate active communicator may be determined.

It is appreciated that active communicator actions may be stored and provided by a system administrator and/or supplemented with a machine learning algorithm to determine whether the identified action by the user 110 is consistent with those of active communicators. As presented above, some of the active communicator actions may be predetermined, e.g., particular sign language, particular hand gestures, eye direction at a particular icon for a certain period of time, etc., and may be known by publicizing to the participants of the electronic conferencing session. However, a subset of the active communicator actions may not be predetermined and may be identified by the machine learning algorithm and may be unknown to the participants of the electronic conferencing session.

It is appreciated that a similar approach is employed to determine whether other users within the electronic conferencing session are active communicators or not. For example, a similar process may be repeated for each of the users, e.g., user 130, user 140, . . . , user 150.

Figure 2A:
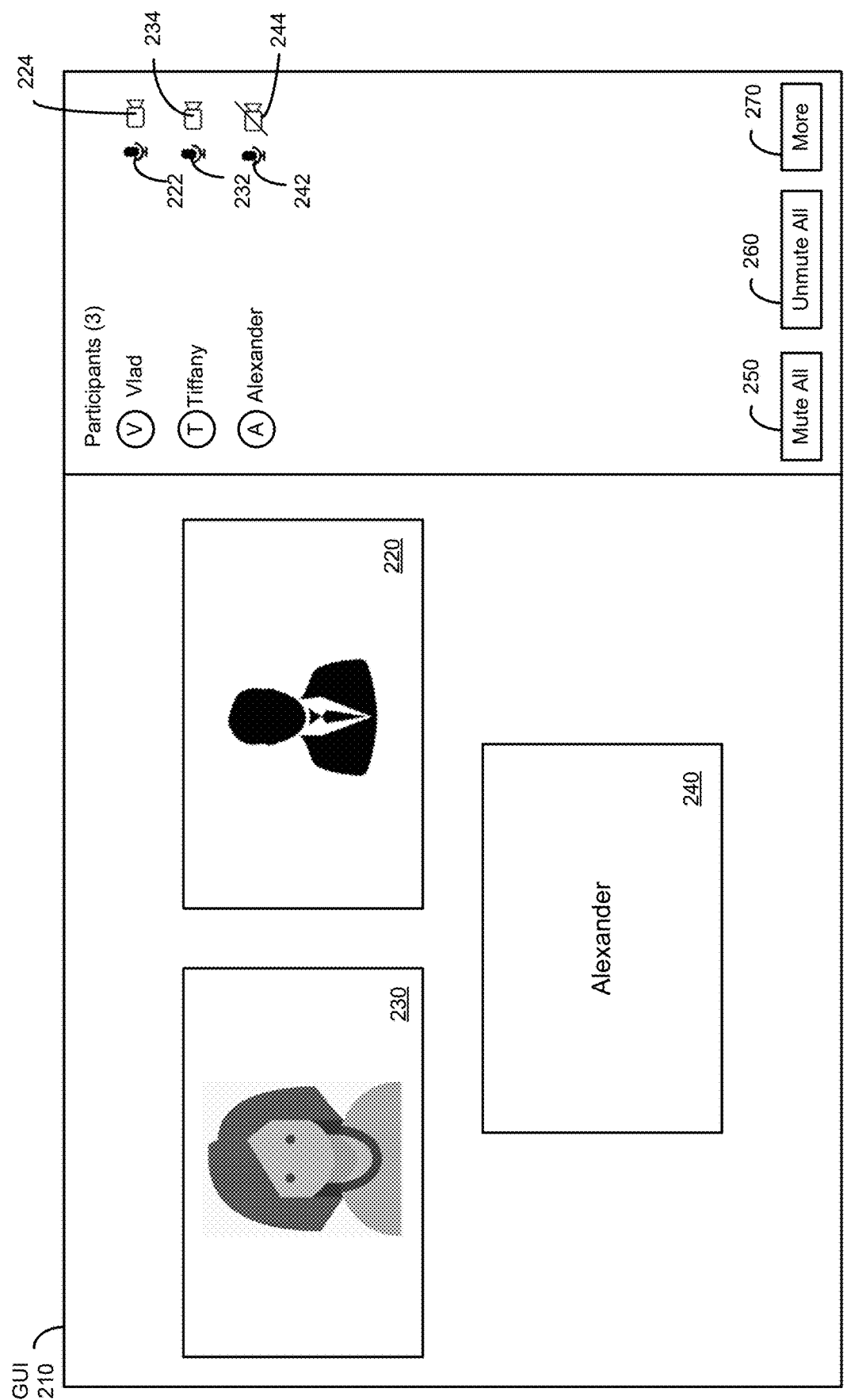
FIG. 2A is an example of a graphical user interface (GUI) rendition during an electronic conferencing session according to some embodiments.

FIG. 2A is an example of a GUI rendition during an electronic conferencing session according to some embodiments. In this example, a GUI 210 is displayed associated with an electronic conferencing session. It is appreciated that the GUI 210 may be displayed for each user and regardless of whether the electronic conferencing session is audio, video, or a combination thereof. In this example, three users are present for the electronic conferencing session, Vlad, Tiffany, and Alexander. A participant frame associated with each user may be rendered. For example, a participant frame 220 may be rendered associated with Vlad, a participant frame 230 may be rendered associated with Tiffany, and a participant frame 240 may be rendered associated with Alexander. It is appreciated that in some nonlimiting examples, the participant frame may be a video feed, picture, avatar, etc., associated with participants of the electronic conferencing session. In this nonlimiting example, Tiffany and Vlad are joining the meeting and are broadcasting video feed while Alexander is joining via audio only. Each participant may have a plurality of associated icons. For example, Vlad may have a microphone 222 icon and a camera 224 icon, while Tiffany may have a microphone 232 icon and a camera 234 icon, while Alexander may have a microphone 242 icon and a camera 244 icon. In this nonlimiting example, the camera 244 icon for Alexander reflects that there is no video feed while camera icons 224 and 234 from Vlad and Tiffany, respectively, reflect that there is video feed.

It is appreciated that the GUI 210 may also include additional control icons such as Mute All 250 icon, Unmute All 260 icon, and More 270 icon. Mute All 250 icon mutes microphones for all participants, Unmute All 260 icon unmutes the microphone for all participants, and the More 270 icon provides additional options to each participant.

Figure 2B:
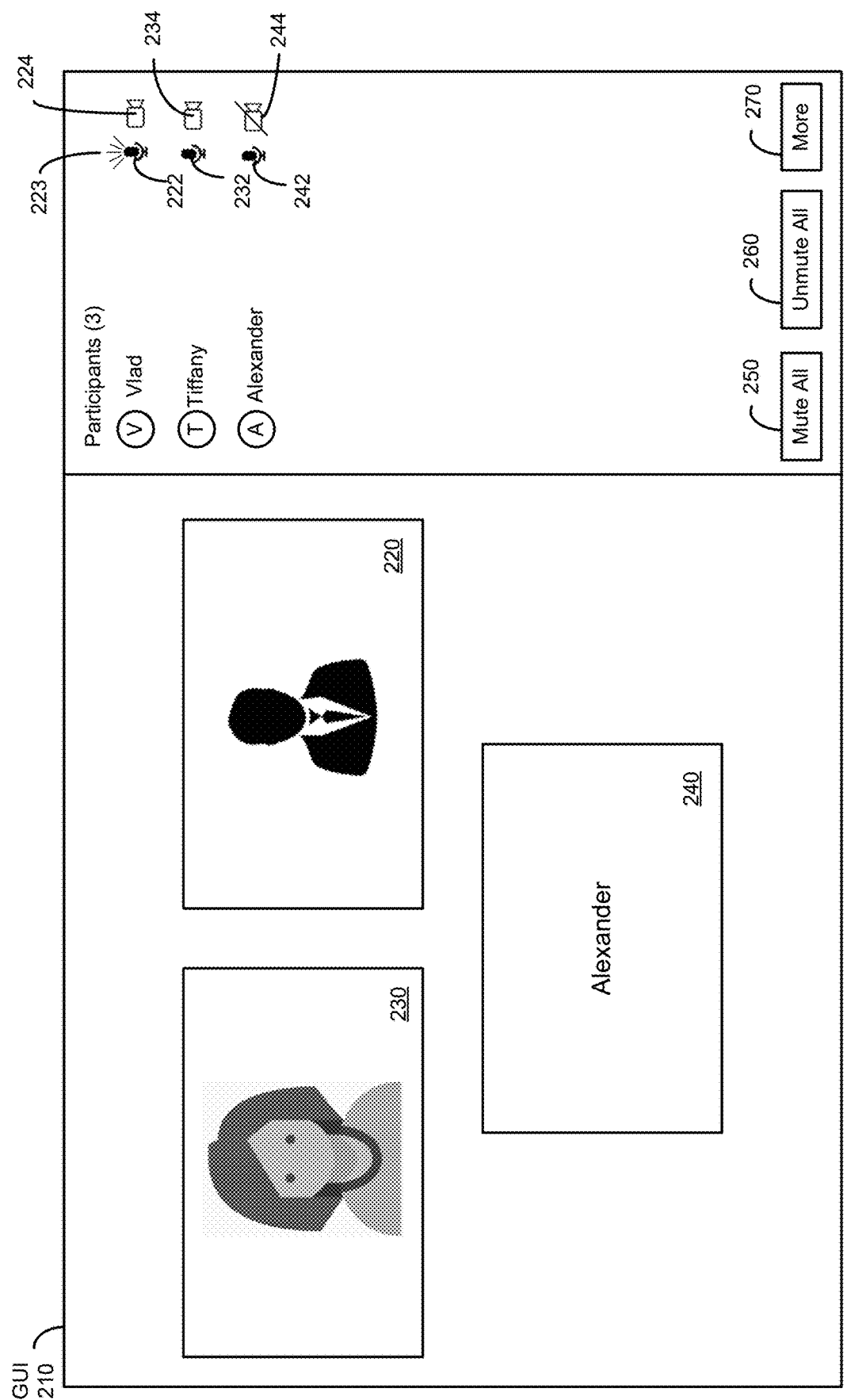
FIG. 2B is an example of a GUI rendition with one active communicator during the electronic conferencing session according to some embodiments.

FIG. 2B is an example of a GUI rendition with one active communicator during the electronic conferencing session, according to some embodiments. In this nonlimiting example, Vlad is speaking. As such, Vlad is graphically designated as the active communicator. In this nonlimiting example, the microphone 222 icon for Vlad is graphically designated 223 as broadcasting audio to graphically designate Vlad as the active communicator.

Figure 2C:
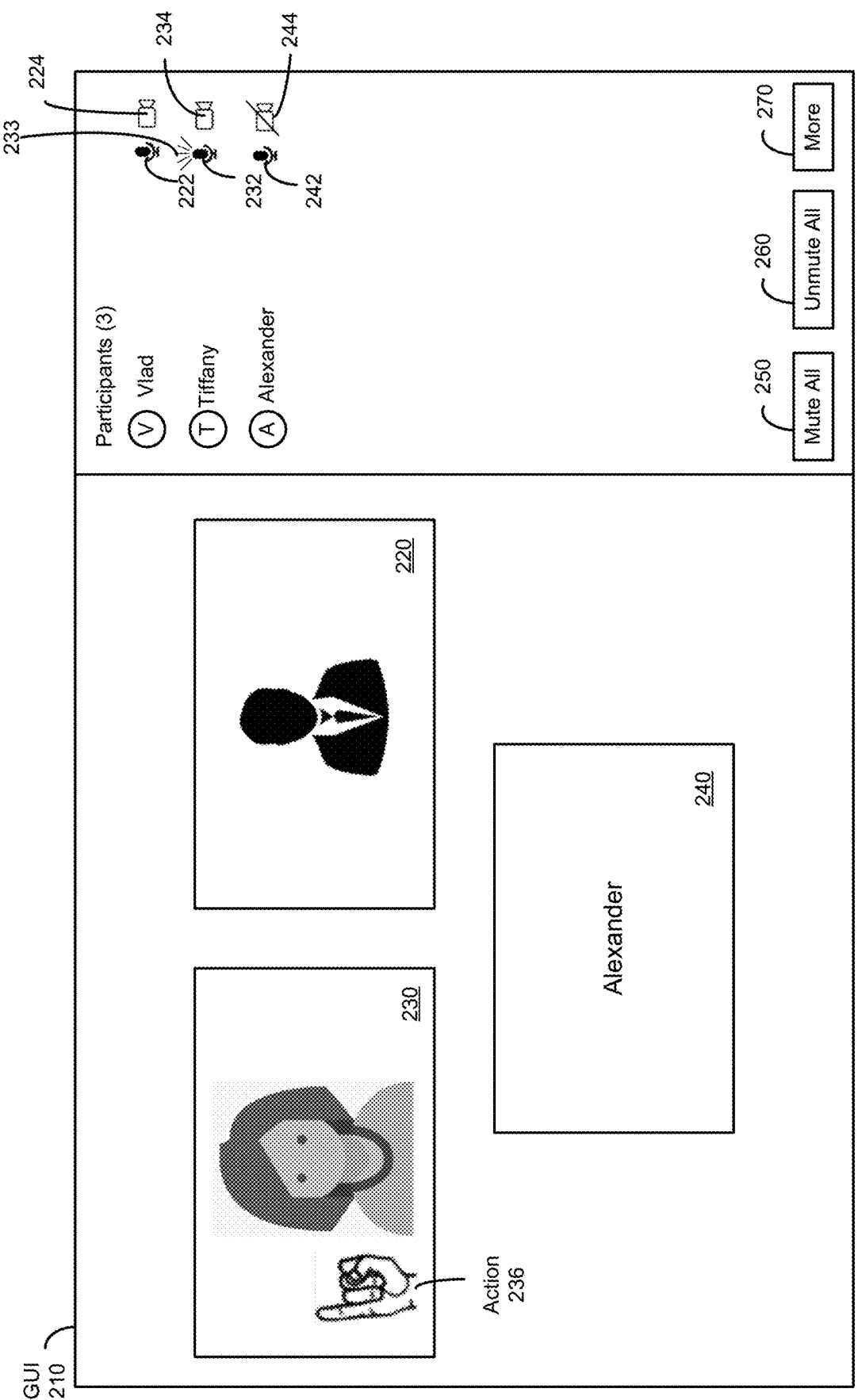
FIG. 2C is an example of a GUI rendition identifying a user as an active communicator based on a cue other than audio level according to some embodiments.

FIG. 2C is an example of a GUI rendition identifying a user as an active communicator based on a cue other than audio level according to some embodiments. In this nonlimiting example, Tiffany performs a certain action 236. The action 236 may be a sign language, body movement, movement pattern, lip movement, hand gesture, etc., as discussed above. The action 236 is captured by the camera and processed, as described above. The action 236 may therefore be identified as a sign language symbol for the first-person singular "I". It is appreciated that in some embodiments, the identified action may be classified using machine learning and clustering algorithms. The identified action 236, in this case the sign language symbol for the first-person singular "I" is compared by the processor to active communicator actions (stored in advance of the electronic conferencing session by the administrator or identified through machine learning algorithm as discussed above). In this nonlimiting example and for illustrative purposes, one of the active communicator actions may be a sign language symbol for the first-person singular "I." As such, a match is found once the identified action 236 is compared to the active communicator actions by a processor. As such, Tiffany is identified as an active communicator. In this nonlimiting example, Tiffany is graphically distinguished from other participants by using the icon 233 to show that Tiffany is broadcasting audio or is an active communicator now.

It is appreciated that video data associated with each user is similarly captured and processed throughout the electronic conferencing session in order to identify the active communicator(s). It is appreciated that the captured video data may not necessarily need to be broadcasted to other users of the electronic conferencing system 120. For example, in this nonlimiting example, Alexander is not broadcasting any video data to other participants, however, the video data associated with Alexander is still being captured and processed in order to determine whether Alexander is an active communicator. In some nonlimiting examples, a camera of an electronic device of a user, e.g., a mobile phone, may be activated and connected via Bluetooth or other communication links to a server. The camera may then capture still images and/or streaming video of the participant and transmit those images to the server for processing. The server may receive the data for processing an determine an active communicator based on processing the one or more images as described in more details above. However, in some embodiments, the captured images are not forwarded or transmitted to other participants of the electronic conferencing session.

Figure 2D:
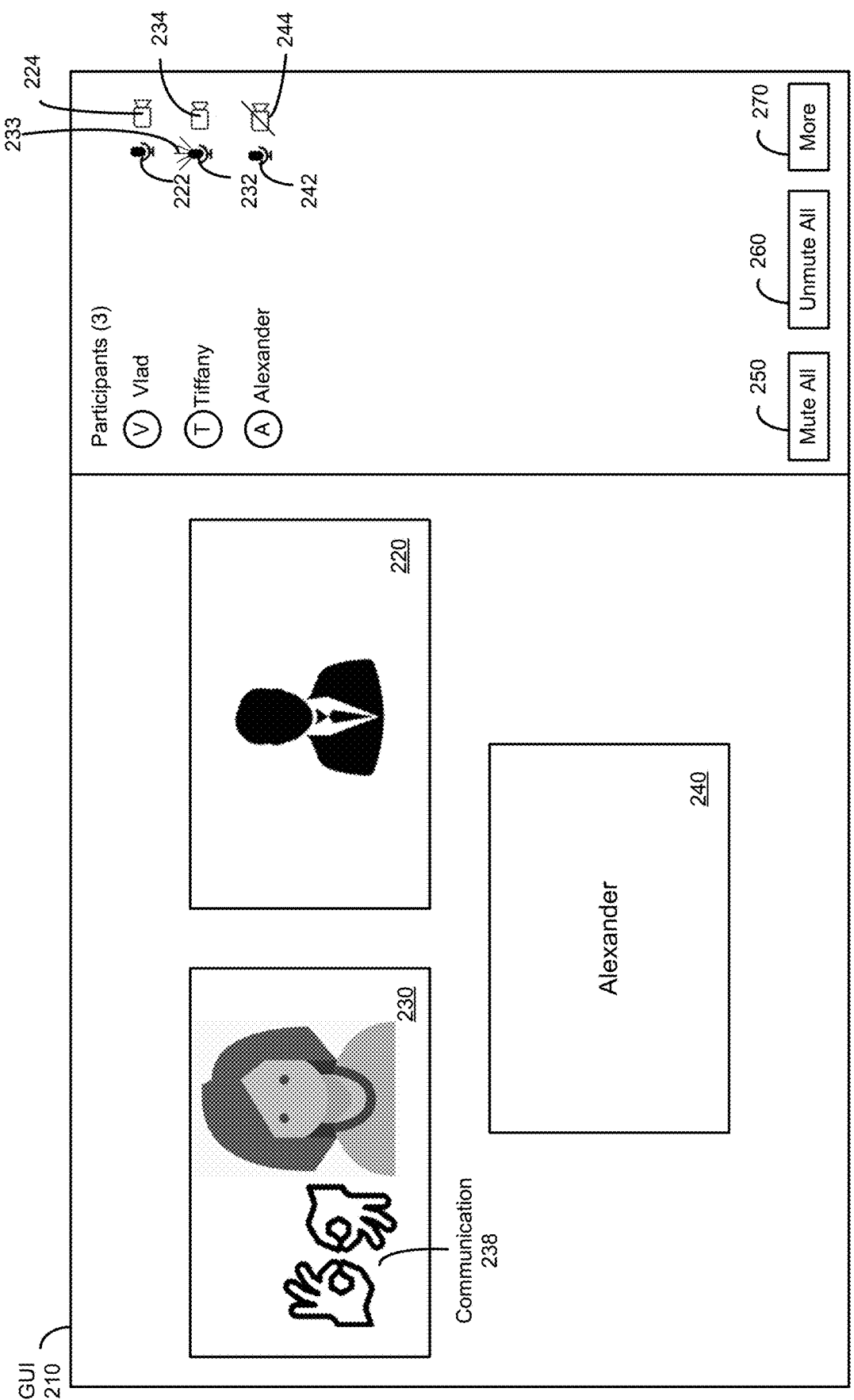
FIG. 2D is an example of a GUI rendition graphically identifying the active communicator communicating with sign language according to some embodiments.

FIG. 2D is an example of a GUI rendition graphically identifying the active communicator communicating with sign language according to some embodiments. In this illustrative example, Tiffany starts communication 238 via sign language with other participants after she has been determined to be an active communicator. It is appreciated that the icon 233 may be associated with Tiffany being an active communicator and communicating. As such, other users can identify the individual that is the active communicator. It is appreciated that in some embodiments that include many participants that cannot fit into one window, the active communicator may be positioned as a first user, e.g., top left window.

Figure 2E:
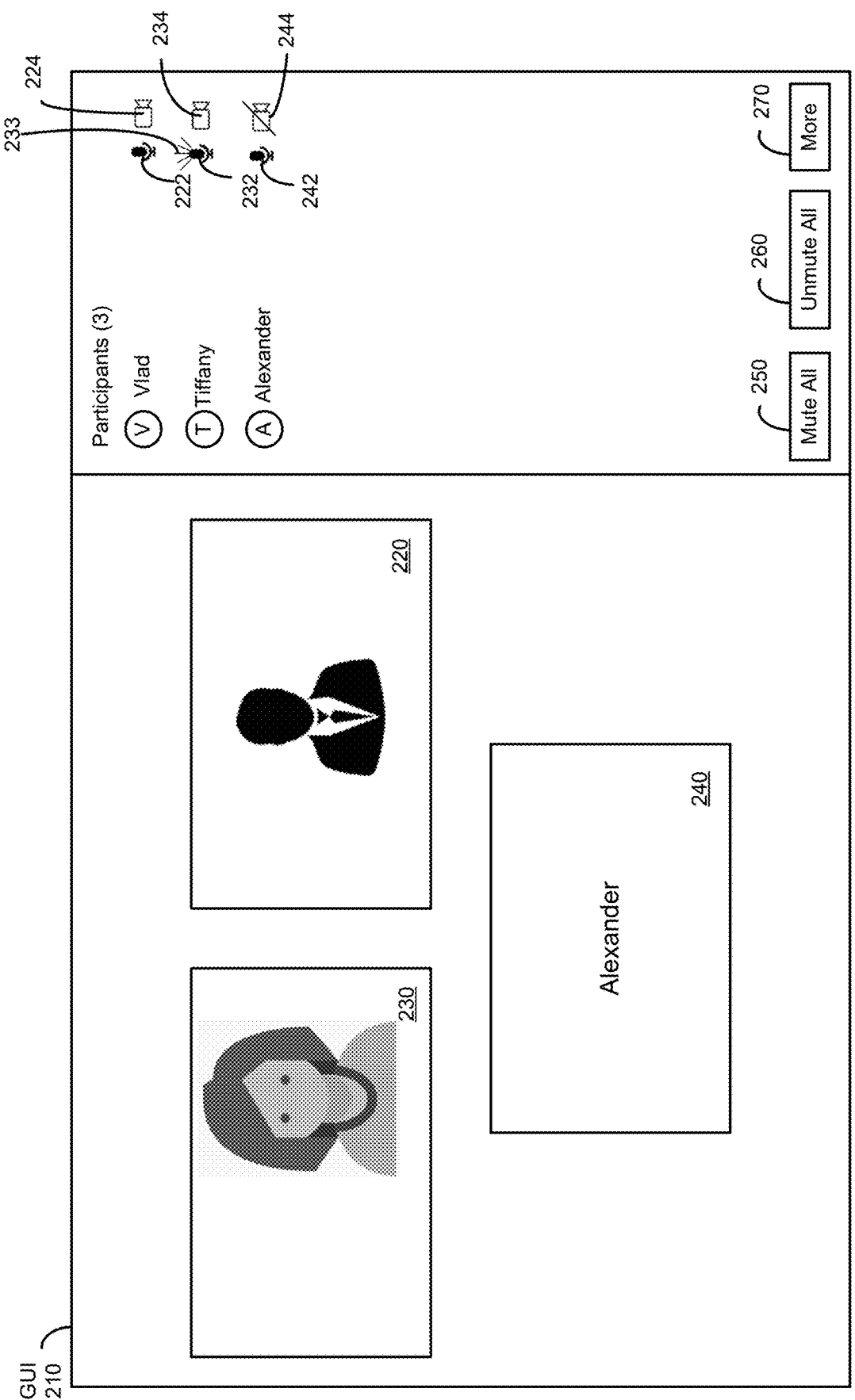
FIG. 2E is an example of a GUI rendition graphically identifying the active communicator communicating by speaking according to some embodiments.

FIG. 2E is an example of a GUI rendition graphically identifying the active communicator communicating by speaking according to some embodiments. In this example, the active communicator Tiffany is an active communicator and communicates by speaking or broadcasting video footage rather than sign language as illustrated in FIG. 2D.

Figure 2F:
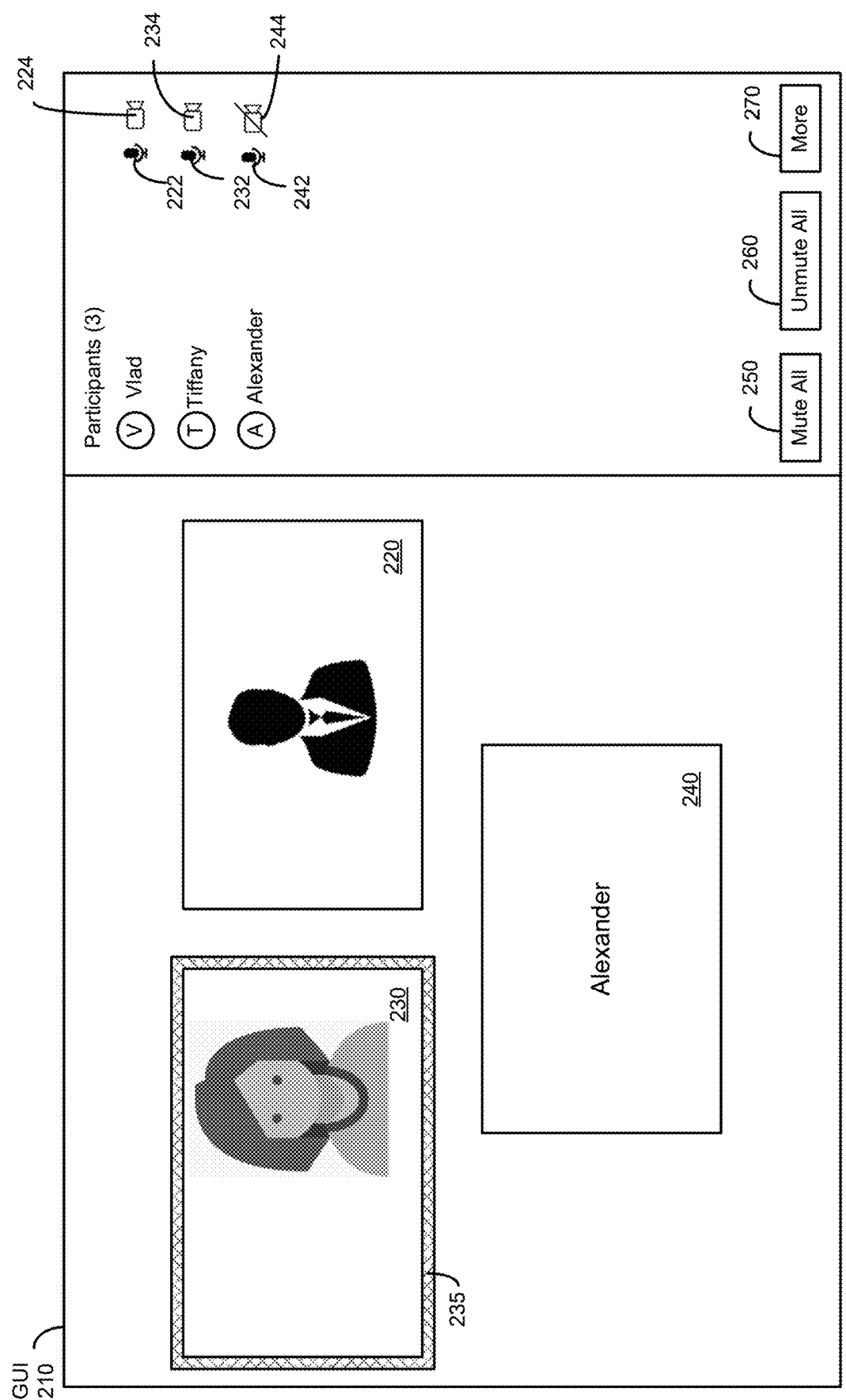
FIG. 2F is an example of a GUI rendition graphically distinguishing the identified active communicator from other participants according to some embodiments.

FIG. 2F is an example of a GUI rendition graphically distinguishing the identified active communicator from other participants according to some embodiments. In this nonlimiting example, Tiffany, the active communicator, is graphically identified as the active communicator by overlaying a border 235 around the participant frame 230 associated with her. It is appreciated that the border 235 may have a color different from the boarders of other participant frames 220 and 240. In some examples, the border 235 may be the same color but rather the thickness of the border may be different from the participant frames 220 and 240 in order to distinguish the active communicator from other users. In some embodiments, the border 235 may be flashing to distinguish the active communicator from other users.

Figure 2G:
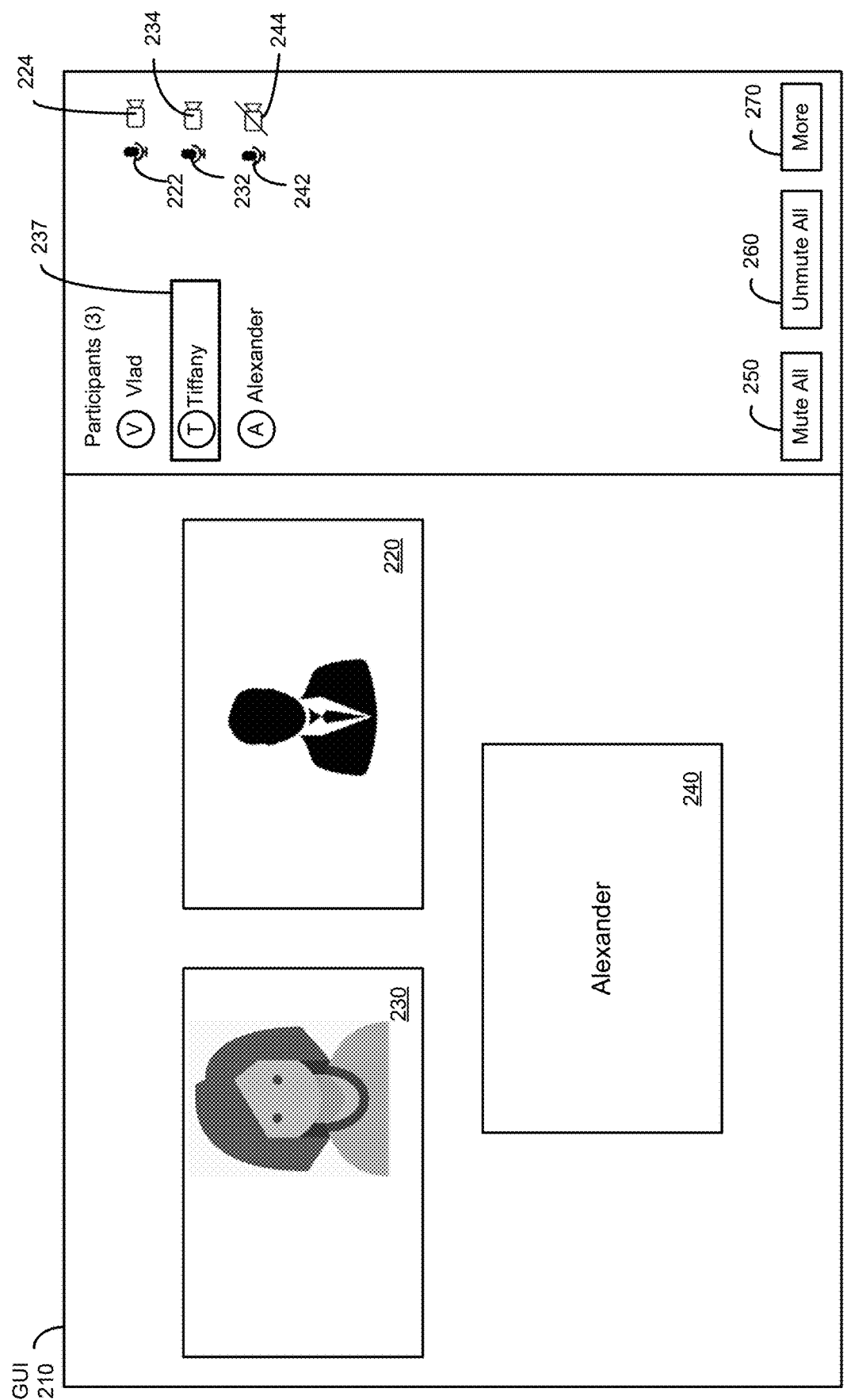
FIG. 2G is yet another example of another GUI rendition graphically distinguishing the identified active communicator from other participants according to some embodiments.

FIG. 2G is yet another example of another GUI rendition graphically distinguishing the identified active communicator from other participants according to some embodiments. In this nonlimiting example, a user identifier associated with the active communicator may be highlighted, emphasized, or overlayed with an active communicator identifier 237. In this nonlimiting example, the active communicator identifier 237 may overlay another icon associated with the active communicator, Tiffany in this case. For example, the active communicator identifier 237 may be a border around the active communicator's identifier or name. It is appreciated that the example is described with respect to the user identifier for illustrative purposes but the embodiments should not be construed as limited therein. For example, the user identifier may be a phone number, handle, or any other identifier associated with the active communicator.

Figure 2H:
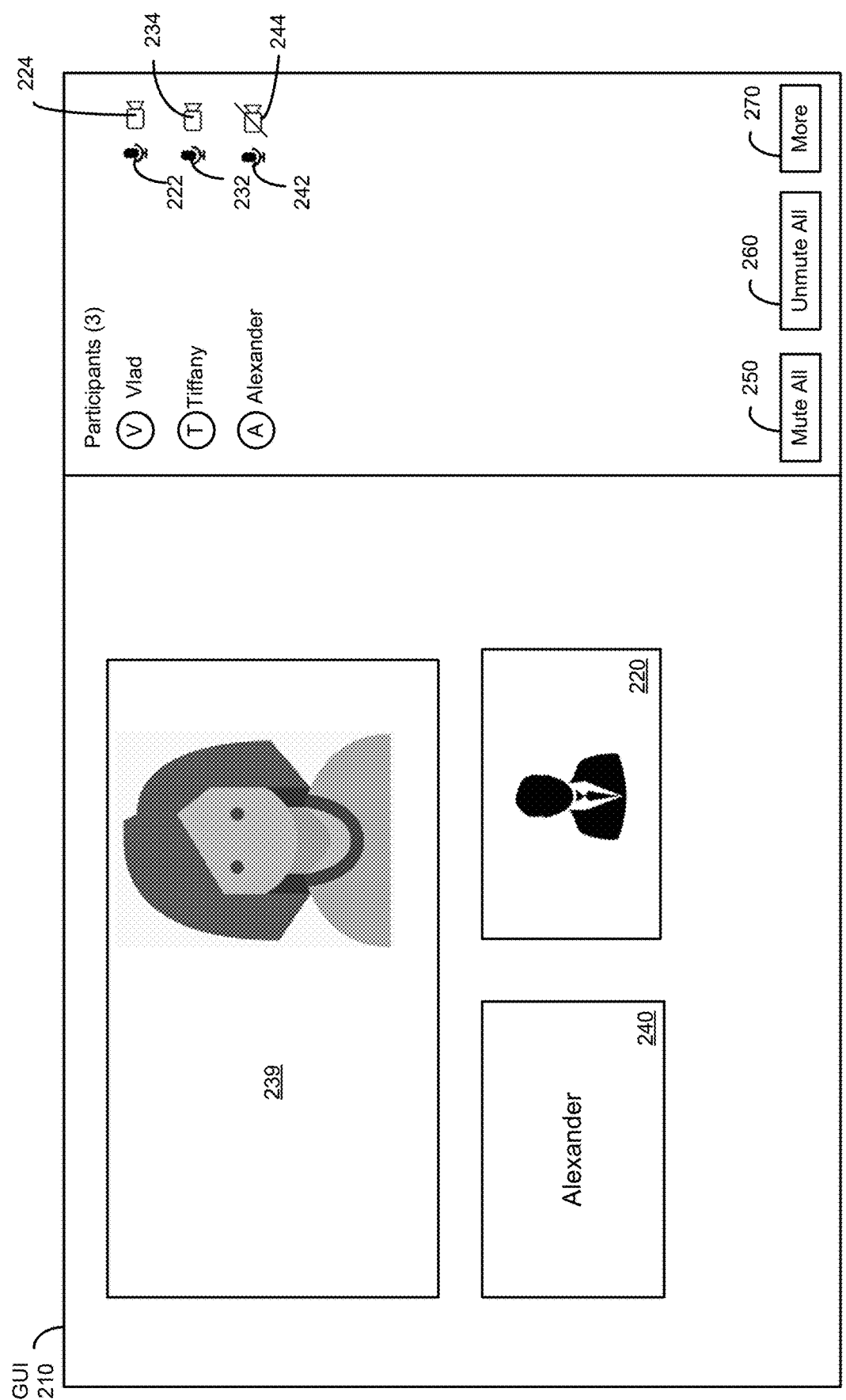
FIG. 2H is further another example of yet another GUI rendition graphically distinguishing the identified active communicator from other participants according to some embodiments.

FIG. 2H is further another example of yet another GUI rendition graphically distinguishing the identified active communicator from other participants according to some embodiments. In some nonlimiting examples, the window (i.e. participant frame) associated with the users may be manipulated to distinguish active communicators from inactive communicators. For example, the participant frame 239 window of the active communicator, Tiffany in this case, may be enlarged relative to inactive communicators, in this case Alexander and Vlad. It is appreciated that in some embodiments, the GUI window of inactive communicators may be reduced in comparison to the active communicators. It is further appreciated that in some embodiments the GUI window of the active communicator may be enlarged while the GUI window of inactive communicators may be reduced.

It is appreciated that active communicator may further be distinguished from inactive communicators by accentuating audio and/or video feed from the active communicator and/or suppressing audio and/or video feed from inactive communicator, or any combination thereof. For example, in some embodiments, the volume of the audio data from active communicators may be increased and/or volume of the audio data from inactive communicators may be reduced or muted. Similarly, video feed from active communicator may be made brighter and sharper and/or video feed from inactive communicators may be blocked, blurred, brightness reduced, the resolution may be reduced, etc. It is appreciated that in some embodiments, the conferencing may also display the active communicator's avatars in color while displaying the inactive communicators' avatars in greyscale.

It is appreciated that FIGS. 2A-2H were provided for illustrative purposes and not intended to limit the scope of the embodiments. Moreover, it is appreciated that any number of users may be attending an electronic conferencing session and that more than one active communicator may be identified. Furthermore, it is appreciated that at a point in FIGS. 2A-2H another user may be identified as an active communicator using a similar process, as described above.

Figure 3:
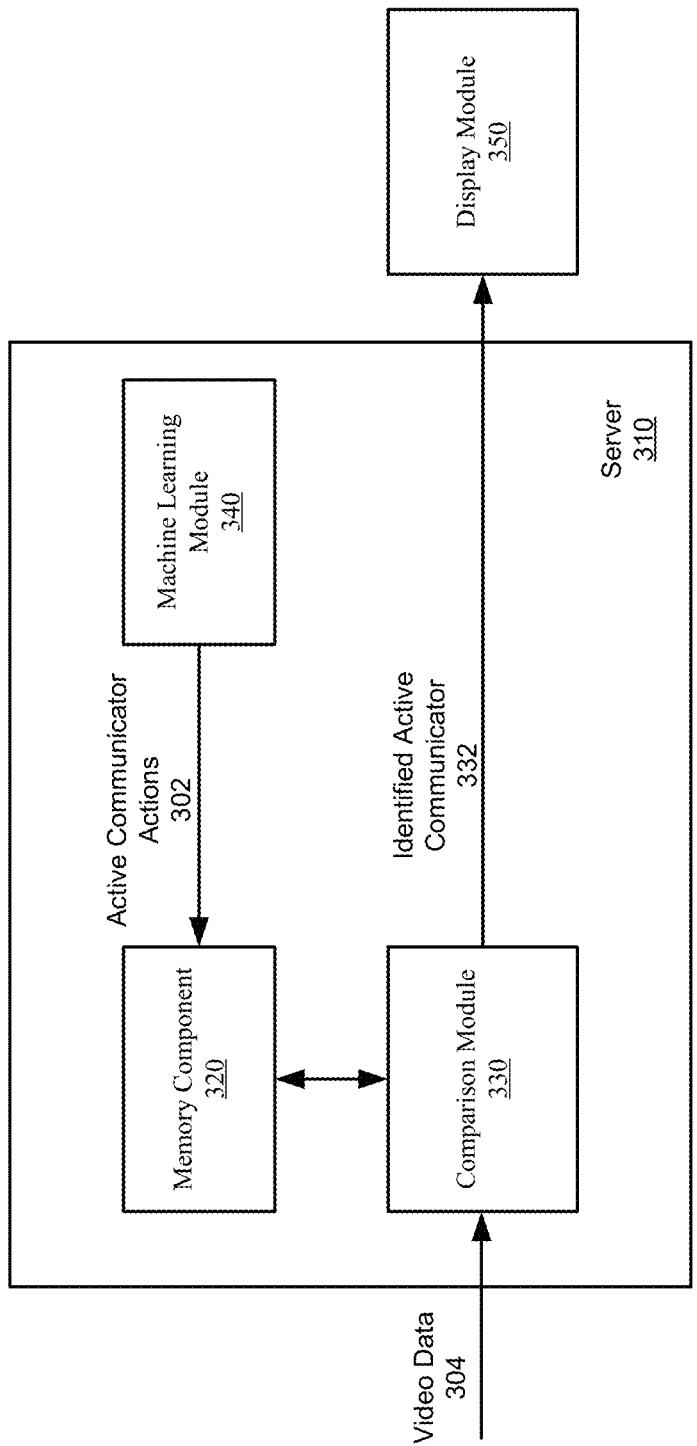
FIG. 3 is a server for identifying active communicator from other participants of an electronic conferencing session according to some embodiments.

FIG. 3 is a server 310 for identifying active communicator from other participants of an electronic conferencing session according to some embodiments. The server 310 includes a memory component 320, a comparison module 330, and a machine learning module 340. The server 310 outputs the identified active communicator 332 to a display module 350. It is appreciated that possible active communicator actions 302 may be transmitted over a communication network from the machine learning module 340 to the memory component 320 for storage. It is appreciated that the possible active communicator actions 302 may be a generated model by the machine learning module 340 that can be used to identify a possible active communicator action. It is appreciated that in some embodiments, an administrator may also provide possible active communicator actions to the memory component 320 for storage thereof (not shown). The possible active communicator actions 302 may be those actions that if performed by a participant of an electronic conferencing session, identifies the participant as an active communicator. For example, as presented above the possible active communicator actions 302 may be a sign language for "I" (first-person singular) or "Speak." Similarly, possible active communicator actions 302 may be certain patterns of body movement, e.g., clapping and touching one's nose, eye movement patterns, staring at a particular icon for a certain period, tilting head, etc.

It is appreciated that the video data 304 from each user of the electronic conferencing session may be transmitted to the comparison module 330. The video data 304 may be processed, as described above, to identify action(s) performed by each user. In some embodiments, the comparison module 330 compares the identified action(s) performed by each user to the possible active communicator actions 302 stored in the memory component 320. If there is a match then the comparison module 330 outputs an identified active communicator 332 signal identifying the user associated with the matched action as an active communicator. It is appreciated that in some embodiments, the display module 350 receives the identified active communicator 332 from the comparison module 330 and graphically distinguishes the active communicator from other participants, e.g., overlaying a border, enlarging the window, etc., as described above. In some embodiments, the audio/video of the active communicator may be accentuated and/or the audio/video of inactive communicators may be attenuated or suppressed, as described above.

Figure 4:
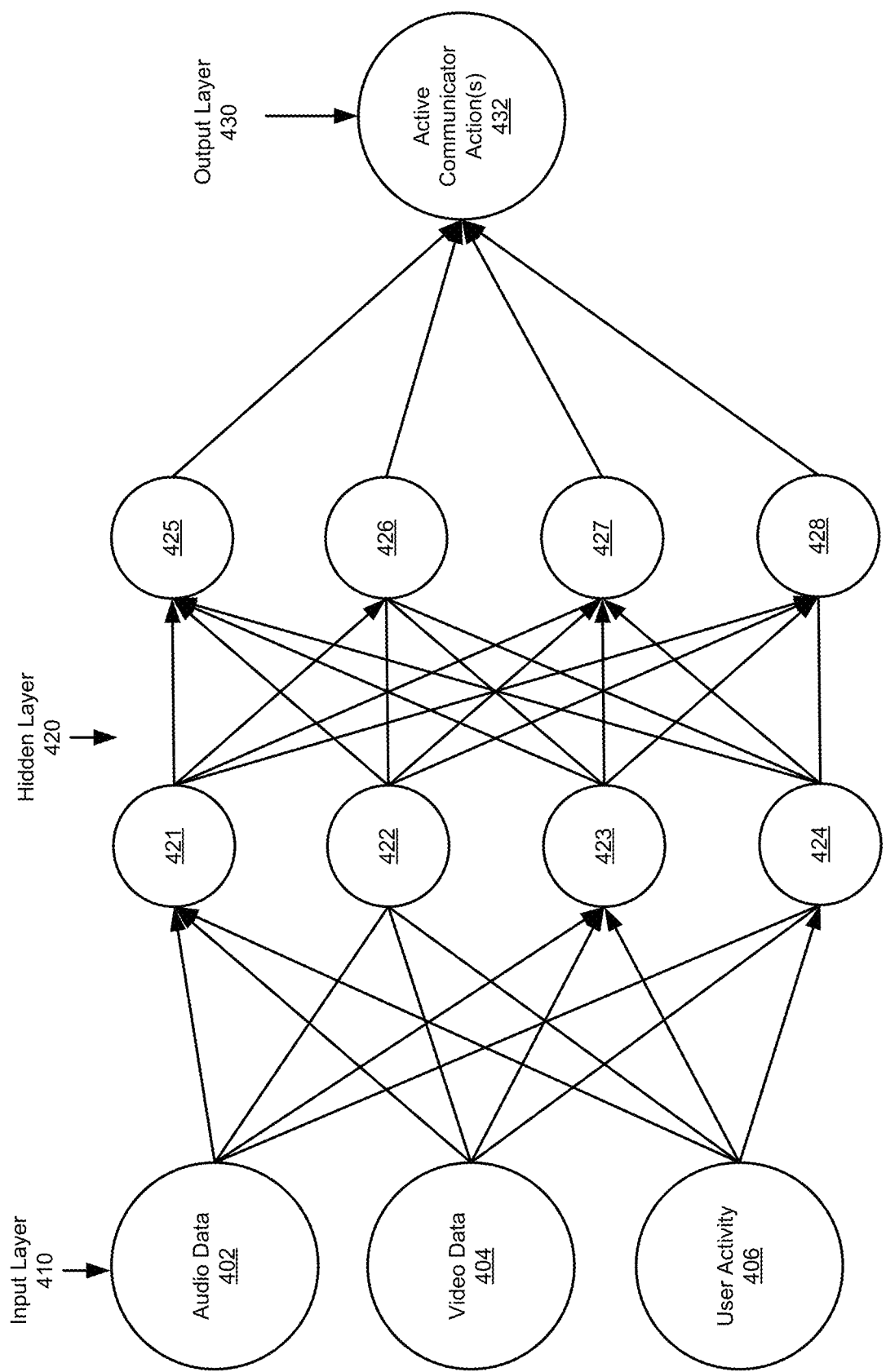
FIG. 4 is a relational node diagram depicting an example of a neural network for identifying the appropriate active communicator in an electronic conferencing session according to some embodiments.

FIG. 4 is a relational node diagram depicting an example of a neural network for identifying the appropriate active communicator in an electronic conferencing session, according to some embodiments. In an example embodiment, the neural network 400 utilizes an input layer 410, one or more hidden layers 420, and an output layer 430 to train the machine learning algorithm(s) or model to identify active communicators of an electronic conferencing session. In some embodiments, where the appropriate active communicator action, e.g., body language, hand gestures, lip movements, etc., as described above, have already been confirmed, supervised learning is used such that known input data, a weighted matrix, and known output data are used to gradually adjust the model to accurately compute the already known output. Once the model is trained, field data is applied as input to the model and a predicted output is generated. In other embodiments, where the appropriate active communicator action has not yet been confirmed, unstructured learning is used such that a model attempts to reconstruct known input data over time in order to learn. FIG. 4 is described as a structured learning model for depiction purposes and is not intended to be limiting.

Training of the neural network 400 using one or more training input matrices, a weight matrix, and one or more known outputs is initiated by one or more computers associated with the online conferencing system. In an embodiment, a server may run known input data through a deep neural network in an attempt to compute a particular known output. For example, a server uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computer then re-computes another output from the deep neural network with the input training matrix and the adjusted weight matrix. This process continues until the computer output matches the corresponding known output. The server computer then repeats this process for each training input dataset until a fully trained model is generated.

In the example of FIG. 4, the input layer 410 includes a plurality of training datasets that are stored as a plurality of training input matrices in a database associated with the online conferencing system. The training input data includes, for example, audio data 402 from participants of an electronic conferencing session, video data 404 from participants of an electronic conferencing session, and user activity 406 within conferencing system such as typing on a keyboard, scrolling using the mouse, and so forth. Any type of input data can be used to train the model.

In an embodiment, audio data 402 is used as one type of input data to train the model, which is described above. In some embodiments, video data 404 are also used as another type of input data to train the model, as described above. Moreover, in some embodiments, user activity 406 within the conferencing system are also used as another type of input data to train the model, as described above.

In the embodiment of FIG. 4, hidden layers 420 represent various computational nodes 421, 422, 423, 424, 425, 426, 427, 428. The lines between each node 421, 422, 423, 424, 425, 426, 427, 428 represent weighted relationships based on the weight matrix. As discussed above, the weight of each line is adjusted overtime as the model is trained. While the embodiment of FIG. 4 features two hidden layers 420, the number of hidden layers is not intended to be limiting. For example, one hidden layer, three hidden layers, ten hidden layers, or any other number of hidden layers may be used for a standard or deep neural network. The example of FIG. 4 also features an output layer 430 with the appropriate active communicator action(s) 432 as the known output. The appropriate active communicator action(s) 432 indicates the appropriate active communicator action for a given conferencing system. For example, the appropriate active communicator action(s) 432 may be a certain body movement (pattern), certain hand gestures, certain sign language, certain eye movements, etc. As discussed above, in this structured model, the appropriate active communicator action(s) 432 is used as a target output for continuously adjusting the weighted relationships of the model. When the model successfully outputs the appropriate active communicator action(s) 432, then the model has been trained and may be used to process live or field data.

Once the neural network 400 of FIG. 4 is trained, the trained model will accept field data at the input layer 410, such as actual identified user action (actions identified by the processor 330 processing the video data 304). In some embodiments, the field data is live data that is accumulated in real time. In other embodiments, the field data may be current data that has been saved in an associated database. The trained model is applied to the field data in order to generate one or more appropriate active communicator action(s) at the output layer 430. Moreover, a trained model can determine that changing active communicator action(s) is appropriate as more data is processed and accumulated over time. Consequently, the trained model will determine the appropriate active communicator action(s) over time. Moreover, the trained model will determine the appropriate changes to be made to the active communicator action(s).

Figure 5:
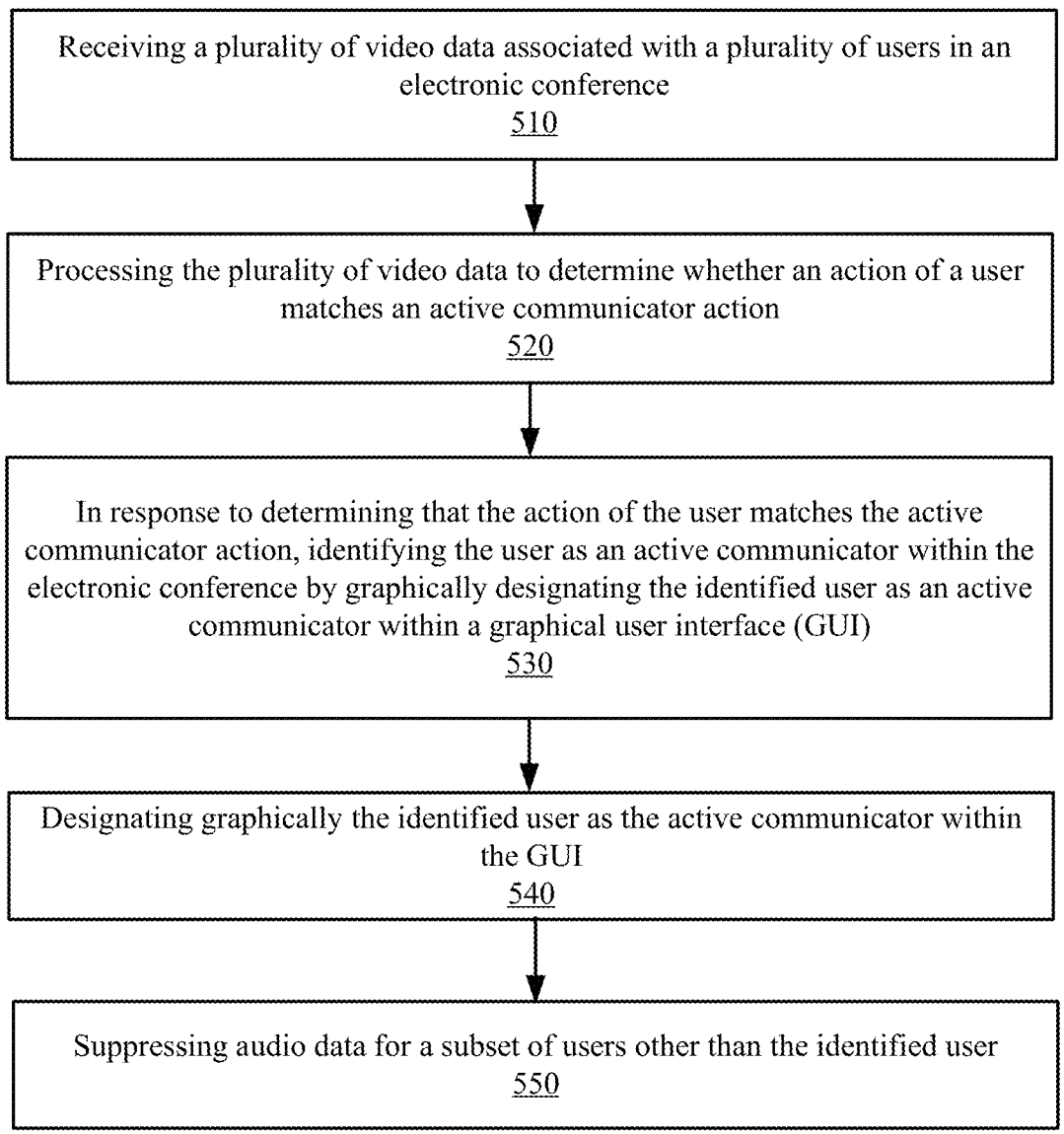
FIG. 5 is a flow chart illustrating an example of method flow for identifying an active communicator in an electronic conferencing session in accordance with some embodiments.

FIG. 5 is a flow chart illustrating an example of method flow for identifying an active communicator in an electronic conferencing session in accordance with some embodiments. As described above communication between a plurality of users may be facilitated. At step 510, the method includes receiving a plurality of video data associated with a plurality of users in an electronic conference. At step 520, the method includes processing the plurality of video data to determine whether an action of a user matches an active communicator action. It is appreciated that in some embodiments, at step 530, the method includes in response to determining that the action of the user matches the active communicator action, identifying the user as an active communicator within the electronic conference by graphically designating the identified user as an active communicator within a GUI.

In some embodiments, at step 540, the method may optionally include designating graphically the identified user as the active communicator within the GUI. It is appreciated that in some embodiments, the designating graphically distinguishes the identified user from users that are inactive communicators of the electronic conference. According to some embodiments, the identified user is graphically distinguished from the users that are inactive communicators of the electronic conference by enlarging an icon (e.g., participant frame) associated with the identified user in comparison to the users that are inactive communicators, by inserting a colored border around to the icon associated with the identified user in comparison to the users that are inactive communicators, or by inserting an indicator icon in the icon associated with the identified user.

It is appreciated that in some embodiments the active communicator action is a hand gesture or a body language or a sign language. According to some embodiments, an audio data or the video data of the identified user is accentuated in comparison to users that are inactive communicators. It is appreciated that the method, at step 550, may optionally include suppressing audio data for a subset of users other than the identified user. Accordingly, active communicator may be identified using video data independent of audio data. In other words, the identification of an active communicator does not rely on audio data but rather relies on video data and processing thereof.

Figure 6:
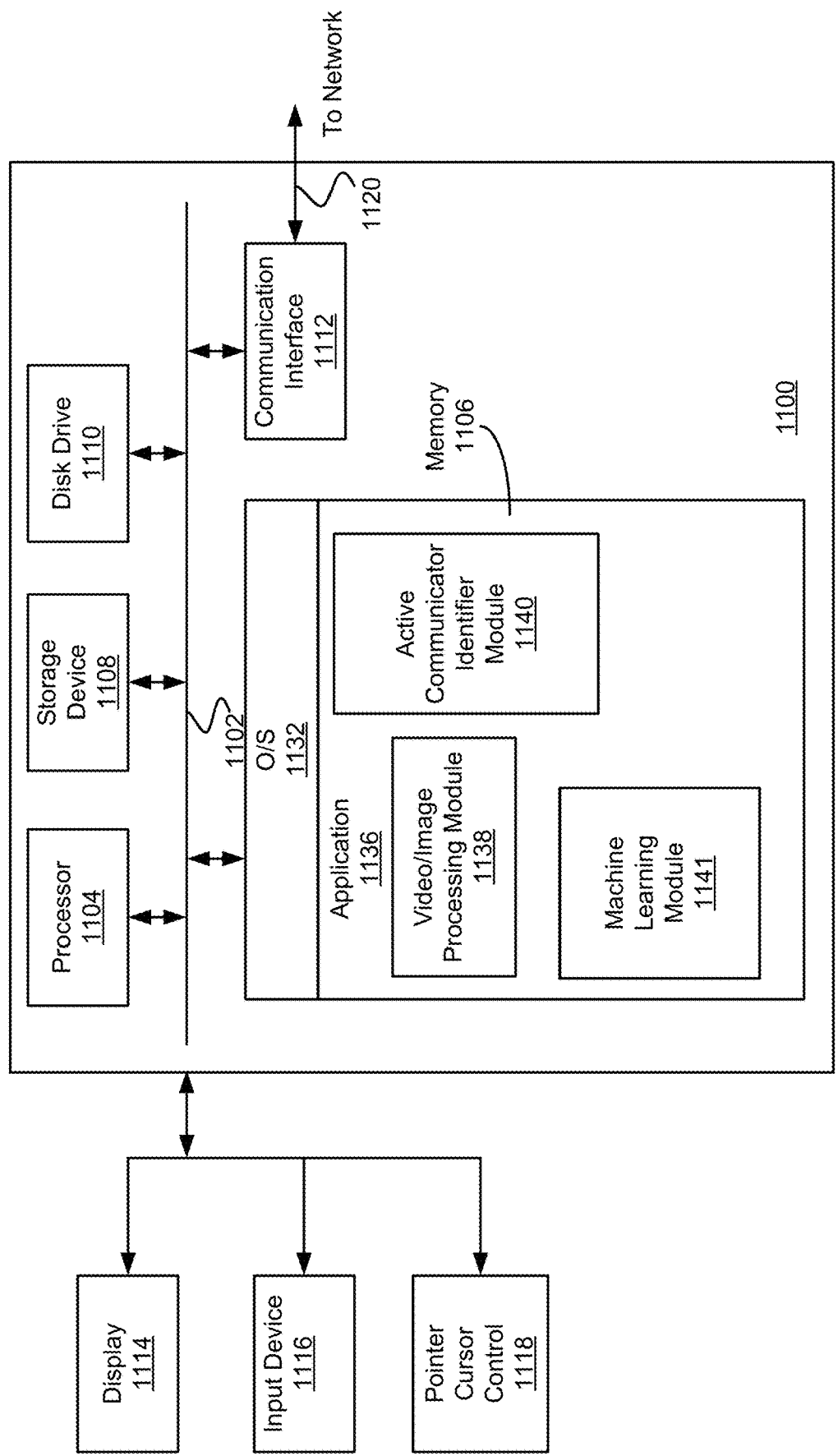
FIG. 6 is a block diagram depicting an example of computer system suitable for identifying an active communicator in an electronic conferencing session in accordance with some embodiments.

FIG. 6 is a block diagram depicting an example of computer system suitable for identifying an active communicator in an electronic conferencing session in accordance with some embodiments. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wired circuitry can be used in place of or in combination with software instructions for implementation. In the example shown, system memory 1106 includes modules of executable instructions for implementing an operating system ("OS") 1132, an application 1136 (e.g., a host, server, web services-based, distributed (i.e., enterprise) application programming interface ("API"), program, procedure or others). Further, application 1136 includes a module of executable instructions for video/image processing module 1138 that determines action performed by a user, machine learning algorithm module 1141 to determine active communicator actions, action participant identifier module 1140 to identify a participant as an active communicator based on a match between the identified user action and the active communicator actions (as determined by the machine learning algorithm module 1141 and/or active communicator actions stored by an administrator in a memory component).

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C #, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A web-based server for determining an active user, comprising:
   a memory storing a set of instructions; and
   at least one processor configured to execute the instructions to:
   facilitate an electronic conference between a plurality of users;
   receive a plurality of video data associated with the plurality of users in the electronic conference;
   process the plurality of video data, using a machine learning model, to determine whether an action of a user matches an active communicator action, wherein the active communicator action is at least one of pointing to a display, staring at a predetermined graphical user interface (GUI) icon for a predetermined amount of time;
   in response to determining that the action of the user matches the active communicator action, identify the user as an active communicator within the electronic conference by graphically designating the identified user as an active communicator within a GUI.

2. The web-based server as described in claim 1, wherein the identified user is distinguished from users that are inactive communicators of the electronic conference.

3. The web-based server as described in claim 1, wherein the graphical designation is by enlarging a participant frame associated with the identified user in comparison to the users that are inactive communicators, by inserting a colored border around the participant frame associated with the identified user in comparison to the users that are inactive communicators, or by inserting an indicator icon in the participant frame associated with the identified user.

4. The web-based server as described in claim 1, wherein the processor is configured to accentuate an audio data or a video data of the identified user in comparison to users that are inactive communicators.

5. The web-based server as described in claim 1, wherein the processor is further configured to suppress audio data for a subset of users other than the identified user.

6. The web-based server as described in claim 1, wherein the user is identified as the active communicator based on video data and independent from audio data.

7. A method, comprising:
   receiving a plurality of video data associated with a plurality of users in an electronic conference;
   processing the plurality of video data, using a machine learning model, to determine whether an action of a user matches an active communicator action, wherein the active communicator action is at least one of raising a hand, pointing to a display, nodding, staring at a predetermined graphical user interface (GUI) icon for a predetermined amount of time, clapping;
   in response to determining that the action of the user matches the active communicator action, determining that the user intends to actively communicate audio or video data in the electronic conference; and
   identifying the user as an active communicator within the electronic conference, wherein the processor is configured to accentuate an audio data and a video data of the identified user in comparison to users that are inactive communicators.

8. The method as described in claim 7, further comprising:
   rendering a graphical user interface (GUI) associated with the electronic conference, wherein the GUI includes participant frame associated with each user of the plurality of users.

9. The method as described in claim 8, further comprising:
   designating graphically the identified user as the active communicator within the GUI.

10. The method as described in claim 9, wherein the designating graphically distinguishes the identified user from users that are inactive communicators of the electronic conference.

11. The method as described in claim 10, wherein the identified user is graphically distinguished from the users that are inactive communicators of the electronic conference by enlarging a participant frame associated with the identified user in comparison to the users that are inactive communicators, by inserting a colored border around to the participant frame associated with the identified user in comparison to the users that are inactive communicators, or by inserting an indicator icon in the participant frame associated with the identified user.

12. The method as described in claim 7, wherein an audio data or the video data of the identified user is accentuated in comparison to users that are inactive communicators.

13. The method as described in claim 7, wherein the active communicator action is a sign language.

14. The method as described in claim 7, further comprising:
suppressing audio data for a subset of users other than the identified user.

15. The method as described in claim 7, wherein the identifying is independent of receiving an audio data.

16. A non-transitory computer-readable medium storing a set of instructions that, when executed by a processor, cause: facilitating an electronic conference between a plurality of users; receiving a plurality of video data associated with the plurality of users in the electronic conference; processing the plurality of video data, using a machine learning model, to determine whether an action of a user matches an active communicator action, wherein the active communicator action is staring at a predetermined graphical user interface (GUI) icon for a predetermined amount of time; in response to determining that the action of the user matches the active communicator action, identifying the user as an active communicator within the electronic conference by graphically designating the identified user as an active communicator within a GUI.

17. The non-transitory computer-readable medium as described in claim 16, wherein the identified user is distinguished from users that are inactive communicators of the electronic conference.

18. The non-transitory computer-readable medium as described in claim 16, wherein the graphical designating include enlarging a participant frame associated with the identified user in comparison to the users that are inactive communicators, inserting a colored border around the participant frame associated with the identified user in comparison to the users that are inactive communicators, or inserting an indicator icon in the participant frame associated with the identified user.

19. The non-transitory computer-readable medium as described in claim 16, wherein an audio data or a video data of the identified user is accentuated in comparison to users that are inactive communicators.

20. The non-transitory computer-readable medium as described in claim 16, wherein audio data for a subset of users other than the identified user is suppressed.

21. The non-transitory computer-readable medium as described in claim 16, wherein the user is identified as the active communicator based on video data and independent from audio data.

* * * * *